United States Patent
Canuto et al.

(10) Patent No.: US 6,659,788 B2
(45) Date of Patent: Dec. 9, 2003

(54) ELECTRIC CONNECTOR FOR THE STEERING WHEEL OF A VEHICLE

(75) Inventors: Oscare Canuto, Collegno (IT); Roberto Martini, Turin (IT)

(73) Assignee: Tyco Electronics AMP Italia S.p.A., Collegno (IT)

( * ) Notice: Subject to any disclaimer, the term of this patent is extended or adjusted under 35 U.S.C. 154(b) by 8 days.

(21) Appl. No.: 10/098,902

(22) Filed: Mar. 14, 2002

(65) Prior Publication Data

US 2002/0151192 A1 Oct. 17, 2002

(30) Foreign Application Priority Data

Mar. 16, 2001 (IT) .................................. TO2001A000246

(51) Int. Cl.[7] ............................................... H01R 13/64
(52) U.S. Cl. ....................................................... 439/248
(58) Field of Search ........................... 439/15, 164, 247, 439/248, 34

(56) References Cited

U.S. PATENT DOCUMENTS 5,246,377 A * 9/1993 Kawahara et al. ............ 439/15
6,012,947 A * 1/2000 Zann et al. .................. 439/557
6,254,408 B1 * 7/2001 Hattori et al. ............... 439/248

* cited by examiner

*Primary Examiner*—Neil Abrams

(57) ABSTRACT

An electric connector for a steering wheel of a vehicle, comprising a connector body having an electric connector. An attachment body having resilient retainer arms for holding the connector body in a pre-assembled position and for engaging the connector body in a final assembly position on the steering wheel, and a complementary connector having an electric contact that couples with the electric connector of the connector body.

17 Claims, 6 Drawing Sheets

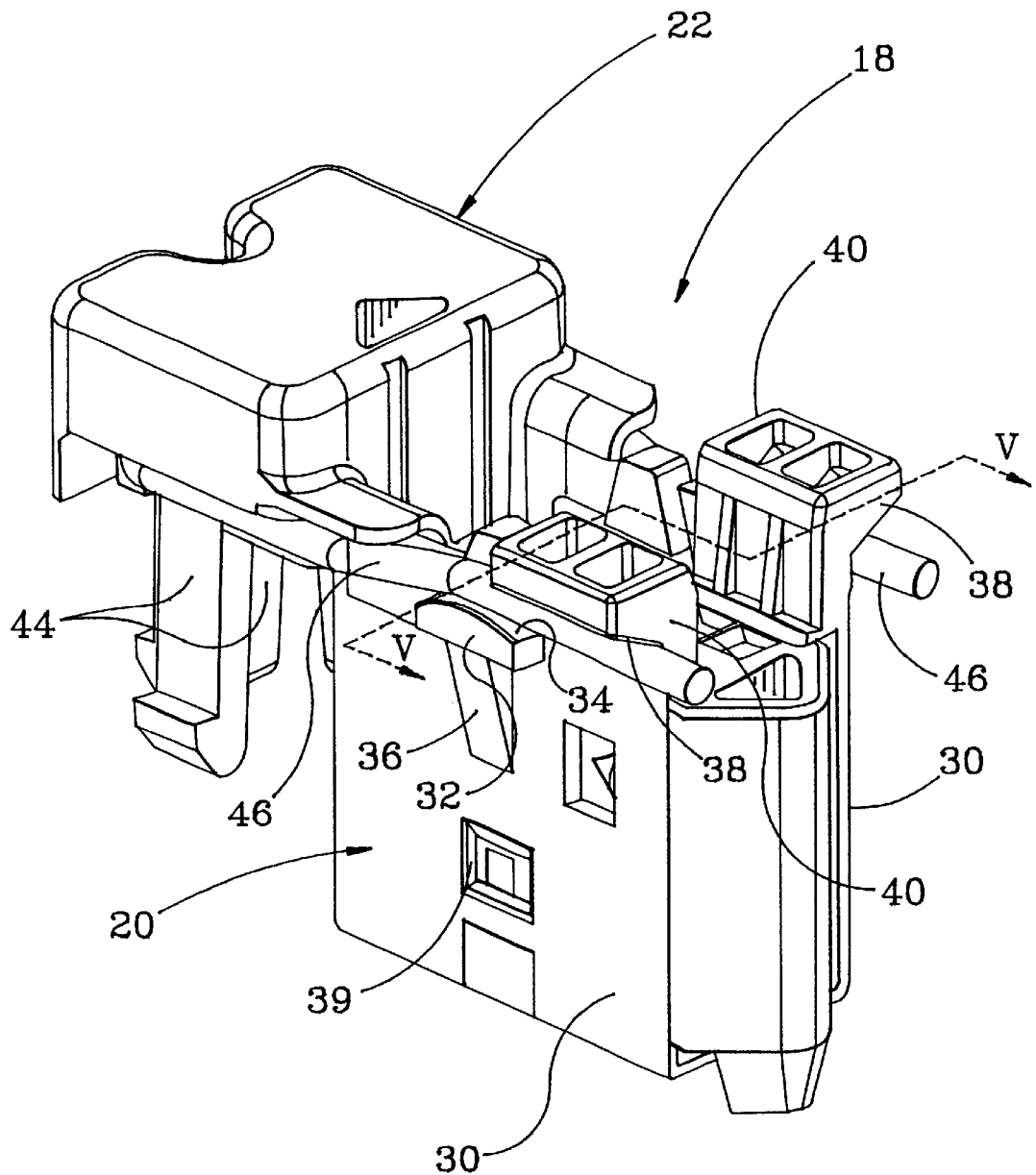
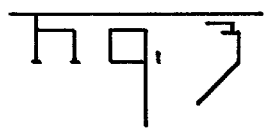

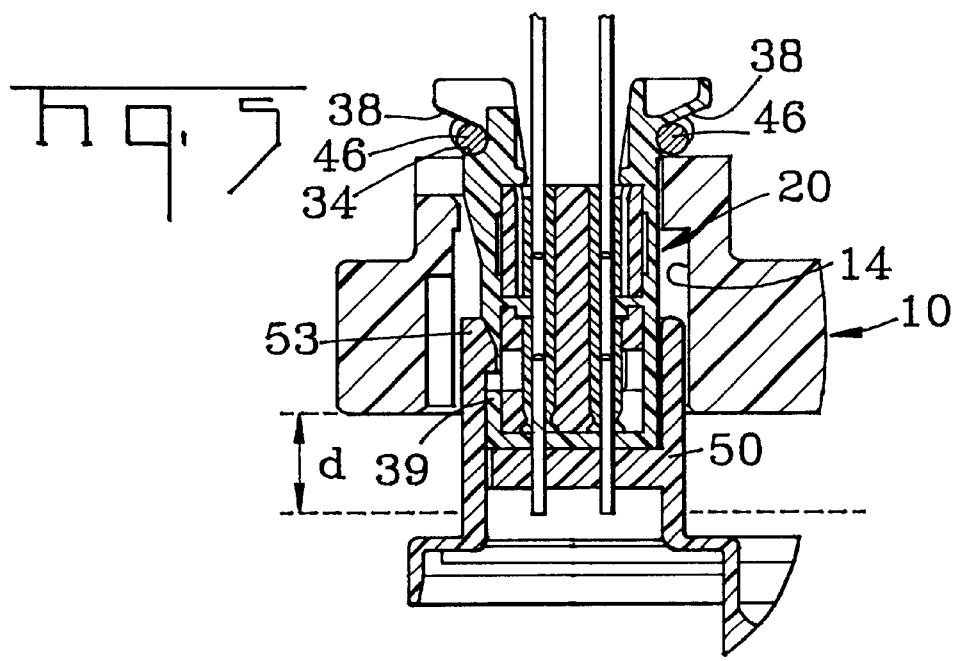
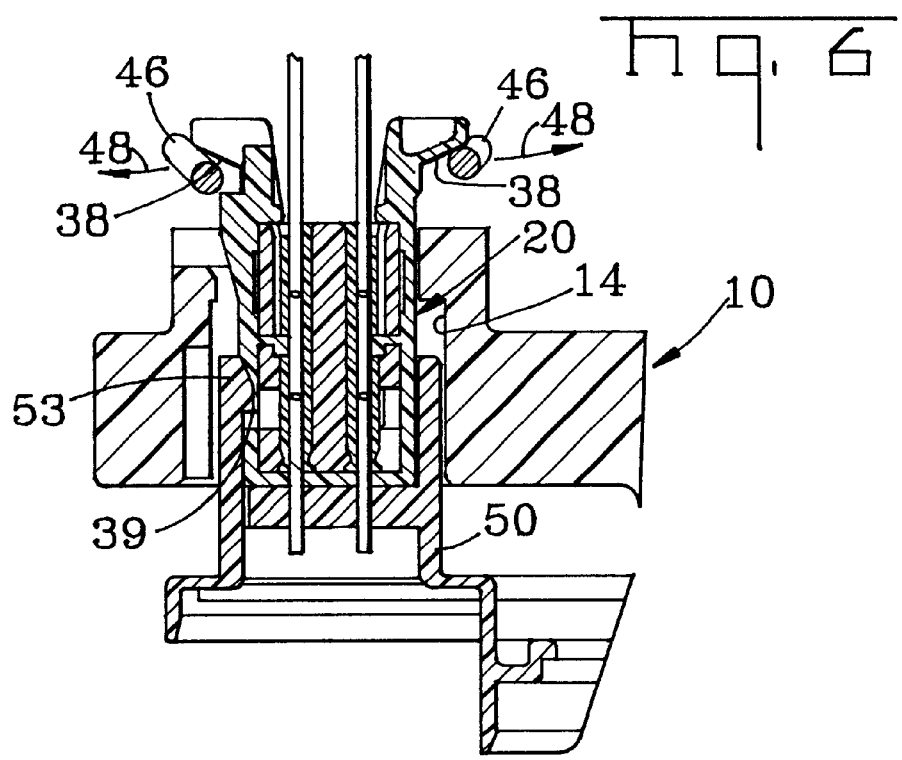

ELECTRIC CONNECTOR FOR THE STEERING WHEEL OF A VEHICLE

BACKGROUND OF THE INVENTION

This invention relates to an electric connector and, more particularly, to an electric connector for a steering wheel of a vehicle.

DESCRIPTION OF THE PRIOR ART

In modern vehicles, an increasing number of electric devices and controls that require electric connection to a power system or control system in the vehicle, are arranged on the steering wheel of the vehicle. Examples of such electric devices include the horn control, the airbag unit, the sound system controls, and the gearbox controls, etc.

Because the steering wheel fitting these devices and controls is a considerably complex unit, automotive manufacturers need to make the steering wheel unit in the form of a pre-assembled unit that can be fitted quickly and easily in the vehicle. A connection system currently used for electrically connecting the steering wheel unit comprises a connector, connected to a flexible wire of a certain length, connected to a device fitted on the steering shaft of the vehicle. In order to fit the steering wheel unit on the steering shaft, the connector is passed through an opening in the steering wheel structure so to engage a connector with a corresponding connector on the steering wheel unit.

In order to engage the steering wheel unit connector to the connector connected to the vehicle, the steering wheel unit connector is usually accessed from the front of the steering wheel. This entails the need to leave an access area in the front of the steering wheel, which is closed after reciprocally engaging the connectors, for example by applying the airbag unit cover. Consequently, the steering wheel unit assembly is completed on the vehicle assembly line after connecting the connectors.

From the automotive manufacturer's point of view, it would be preferable to avail of a fully independent steering wheel unit that does not require complementary assembly operations to be carried out on the vehicle assembly line.

SUMMARY OF THE INVENTION

The invention relates to an electric connector for a steering wheel of a vehicle, comprising a connector body, an attachment body and a complementary connector. The connector body having an electric connector. The attachment body being releasable attached to the connector body, and the complementary connector having an electric contact that couples with the electric connector of the connector body.

BRIEF DESCRIPTION OF THE DRAWINGS

The invention will now be described by way of example with reference to the accompanying figures wherein:

FIG. 3 is a perspective view of the connector according to arrow III in FIG. 2.

FIG. 5 is a cross-sectional view taken along line V—V in FIG. 3, illustrating the initial engagement sequence of the connector.

FIG. 6 is a cross-sectional view taken along line V—V in FIG. 3, illustrating the intermediate engagement sequence of the connector.

DETAILED DESCRIPTION OF THE PREFERRED EMBODIMENT

Figure 1:
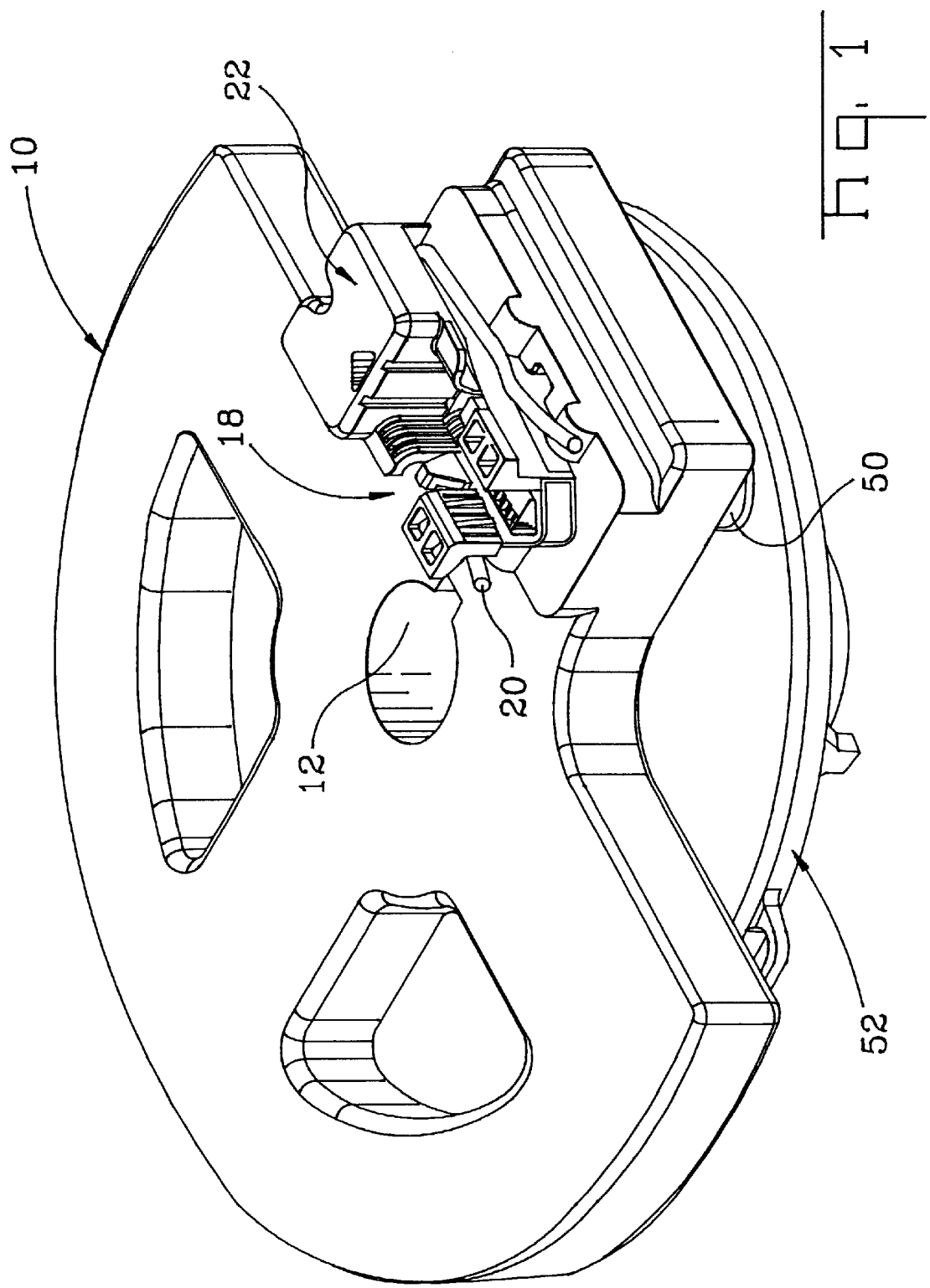
FIG. 1 is a perspective view of a steering wheel unit with a connector according to the invention.
Figure 2:
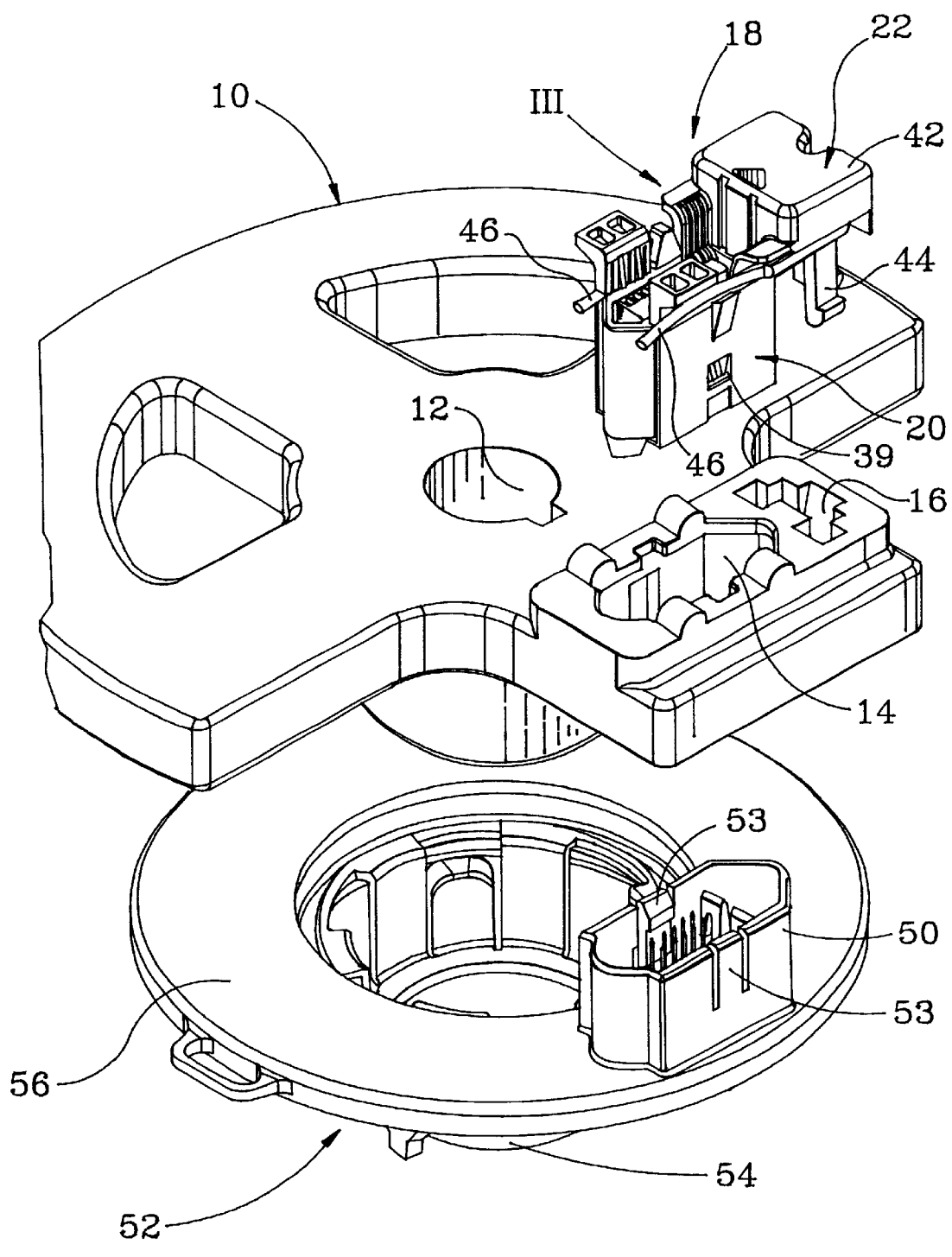
FIG. 2 is a schematic view of the steering wheel unit shown in FIG. 1.

FIGS. 1 and 2 show a structure of a steering wheel 10 of a vehicle. The remaining part of the steering wheel is not shown because it is not included in the scope of this invention and is well known by those skilled in the art. The structure of the steering wheel 10 comprises a hole 12 for fitting the steering wheel on a steering shaft (not shown) of the vehicle. The structure of the steering wheel 10 also comprises a connector housing 14 and an attachment housing 16. The connector housing 14 is passing while the attachment housing 16 can be either blind or passing. The connector and attachment housings 14, 16 can be formed integrally by casting or moulding with the remaining part of the structure of the steering wheel 10. It will also be understood and appreciated by those skilled in the art that in an alternative form of the embodiment, not illustrated herein, a single housing may be used to perform the function of both housings 14, 16.

Figure 4:
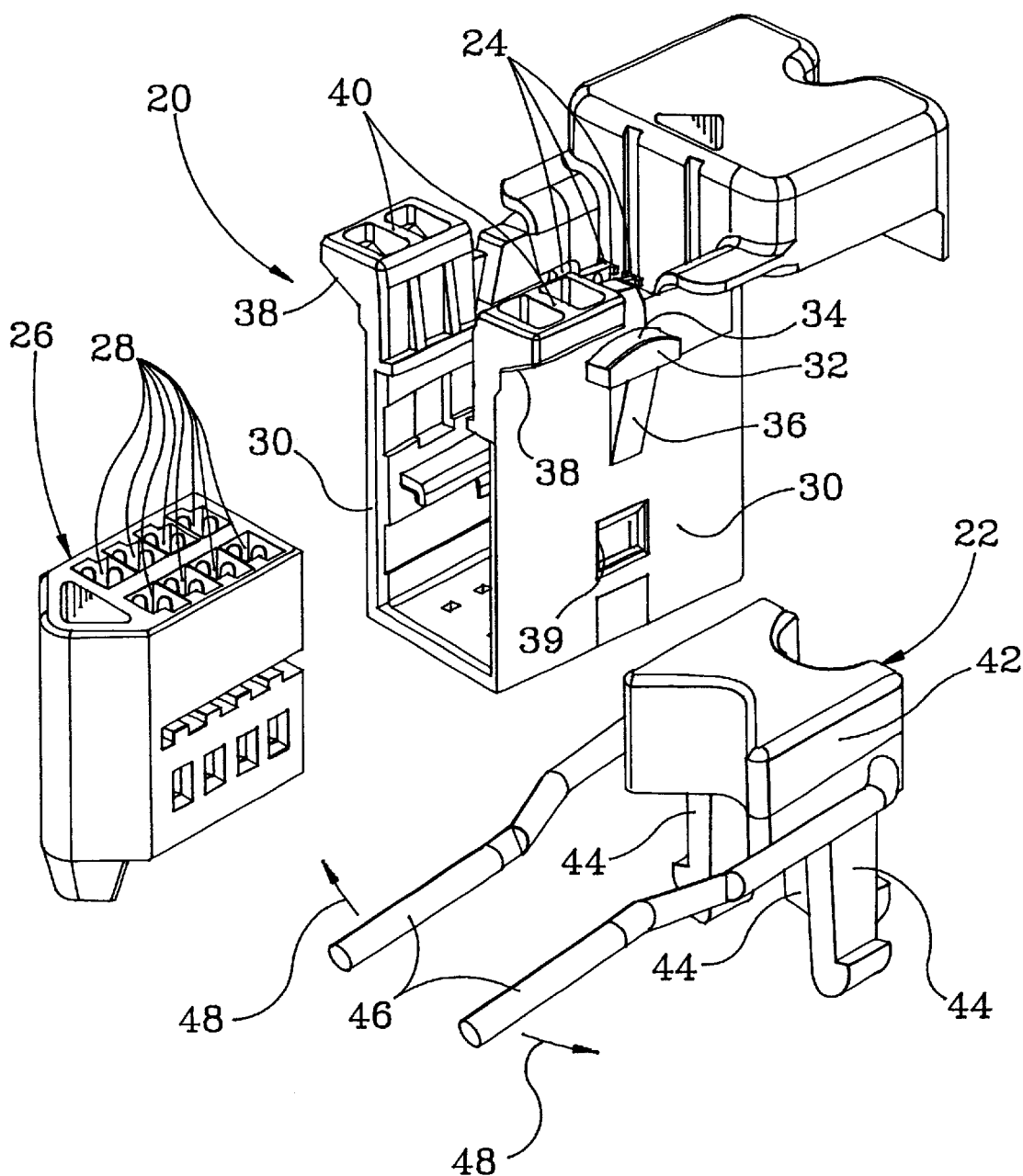
FIG. 4 is a perspective view of the main components of the connector in FIG. 3.

Shown in FIGS. 3 and 4, a connector 18 comprises a connector body 20 and an attachment device 22. The connector body 20 is made of a material such as an injection molded plastic and has a set of electric contacts. In the illustrated form of embodiment, the connector body 20 is equipped with a first set of contact housings 24 and is made in the form of an enclosure destined to receive a secondary connector body 26 equipped with a second set of contact housings 28. It will be appreciated and understood by those skilled in the art that for the purposes of this invention, the first and second set of contact housings 24, 28 could be formed all in the body of the connector body 20 and that the number of electric contacts in the connector body 20 and the secondary connector body 26 may vary according to the desired application. In the form of embodiment illustrated for the purpose of example in the drawings, there are eight contact housings 28 in the secondary connector body 26 and four contact housings 24 in the connector body 20.

The connector body 20 has substantially parallel sides 30 having projecting portions 32. Each projecting portion 32 has an upper resting surface 34. The lower part of each projecting portion 32 is fitted to an external surface of the respective parallel side 30 by means of a wedged portion 36. The connector body 20 also comprises a pair of cam surfaces 38 facing downwards and formed on lateral projecting portions 40 that are integral to a top portion of the parallel sides 30. Viewing the connector body 20 along a direction perpendicular to the parallel sides 30, the cam surfaces 38 are moved laterally with respect to the resting surface 34. The connector body 20 is also equipped with a pair of windows 39.

Shown in FIG. 4, the attachment device 22 comprises an attaching body 42, preferably made of a plastic material, and having clip-on engagement elements 44 that anchor the attachment body 42 in the attachment housing 16 of the structure of the steering wheel 10. The attachment device 22 further comprises a pair of retainer arms 46 projecting from the attachment body 42. Preferably, the retainer arms 46 are formed by a contoured metallic material wire of the type used for the production of springs. The contoured wire forming the retainer arms 46 is preferably co-moulded to the attachment body 42, such that the section of wire joining the arms 46 is encased in the plastic material forming the body 42. The retainer arms 46 are elastically deformable in the direction shown by arrows 48 in FIG. 4 and, in rest conditions, the retainer arms 46 are reciprocally distanced by a quantity equal to or lower than the distance between the external surfaces of the parallel sides 30 of the connector body 20.

FIG. 3 illustrates the configuration in which the connector body 20 is connected to the attachment device 22 by means of the retainer arms 46. The attachment device 22 is connected in such a way that it cannot be released from the connector body 20. Each of the retainer arms 46 is arranged over the respective resting surface 34 and under the respective cam surface 38. The wedged portions 36 are useful during the assembly of the connector body 20 on the attachment device 22 because this assembly can be carried out by sliding the retainer arms 46 along the external surface of the parallel sides 30 with a movement from the bottom upwards, until the retainer arms 46 clip and engage the opposite surfaces 34, 38.

With reference to FIG. 2, the connector 18 establishes an electric connection with a complementary connector 50 leading to an electric connection device 52. The connection device 52 comprises a lower part 54 and an upper part 56. The lower part 54 is stationary in use, and the upper part 56 holds the complementary connector 50, which is integral to the steering wheel in use. The electric connection device 52 contains an electric wire (not shown) wound in the shape of a spiral that establishes the electric contact between the steering wheel and the vehicle by means of the reciprocally coupled complementary connector 50 and the connector 18. The complementary connector 50 comprises a pair of clip-on engagement prongs 53 that engage the windows 39 of the connector body 20.

As better described below, during assembly of the steering wheel on the steering shaft (not shown), the connector 18 engages the complementary connector 50. The connector 18 according to this invention is achieved so to ensure the correct coupling between the electric contacts of the mutually co-operating connectors 18, 50, regardless of assembly tolerance. Due to the tolerance between the steering shaft (not shown) and the complementary connector 50, as well as the tolerance between the hole 12 and the connector 18, the correct coupling position of the steering wheel and the steering shaft (not shown) does not always correspond to the correct engagement position of the complimentary connector 50 and the connector 18. For this reason, the connector body 20 is released from the attachment device 22 in the connector 18 during steering wheel assembly, so that the connector body 20 is free to be arranged in the optimal coupling position with respect to the complementary connector 50.

The steering wheel unit, comprising all devices, accessories and electric controls, is pre-assembled so to form an autonomous unit. The various electric devices and controls of the steering wheel unit are connected to the respective electric controls of the connector 18. The assembly of connector 18 to the structure of the steering wheel 10 is achieved by inserting the attachment device 22 in the attachment housing 16 so that the clip-on engagement elements 44 engage the attachment housing 16. The connector body 20, connected to the attachment device 22 by means of the retainer arms 46, avails of the play inside the connector housing 14.

The pre-assembled steering wheel unit is consequently fitted on the steering shaft (not shown) of the vehicle where the electric connection device 52 has previously been fitted. This assembly is achieved by inserting the steering wheel on the steering shaft (not shown) and pushing the steering wheel along the steering shaft (not shown) so that the steering wheel reaches its final assembly position.

Figure 7:
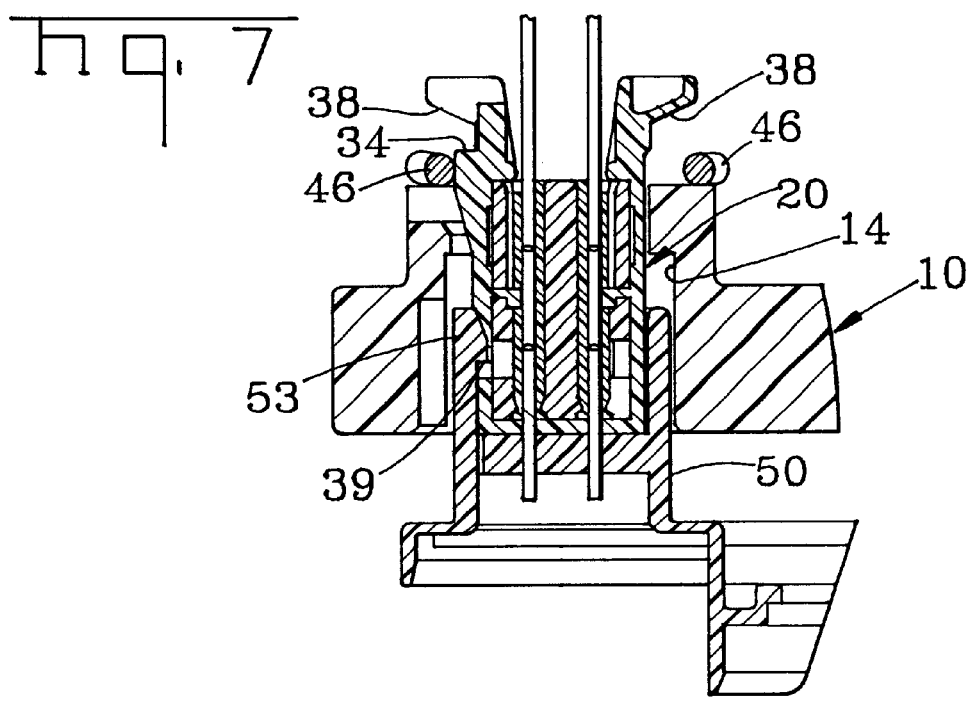
FIG. 7 is a cross-sectional view taken along line V—V in FIG. 3, illustrating the intermediate engagement sequence of the connector.
Figure 8:
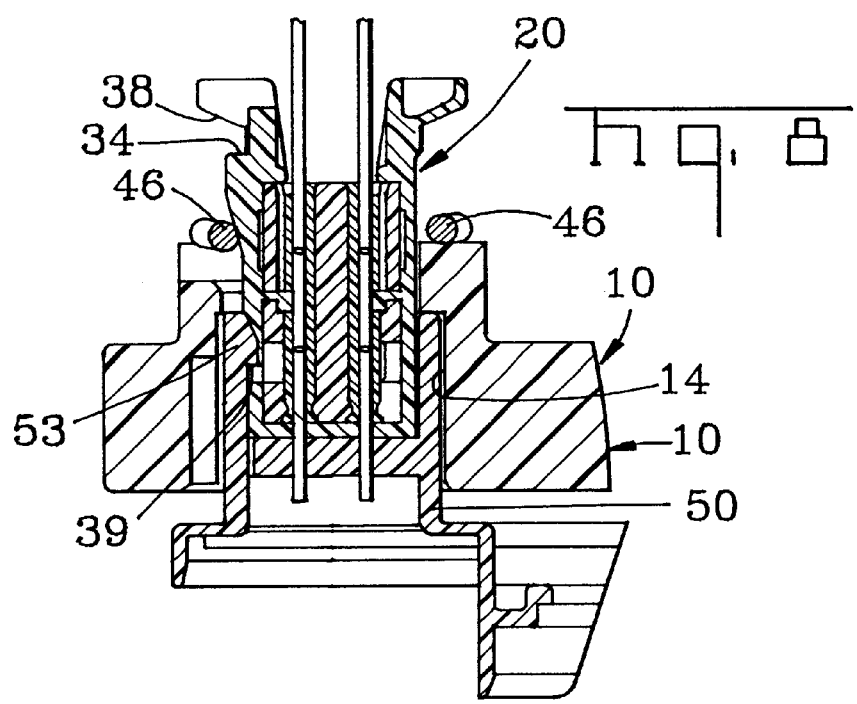
FIG. 8 is a cross-sectional view taken along line V—V in FIG. 3, illustrating the final engagement sequence of the connector.

FIGS. 5 through 8 illustrate the various positions of the connector 18 during the movement of the steering wheel on the axis of the steering shaft (not shown). FIG. 5 illustrates the initial assembly position. FIGS. 6 and 7 illustrate the intermediate assembly positions. FIG. 8 illustrates the final assembly position.

With reference to FIG. 5, the position of the connector body 20 with respect to the structure of the steering wheel 10 in the pre-assembled conditions of the steering wheel is established so that, considering the possible tolerance, the connector body 20 reaches the position of complete engagement with the complementary connector 50 before the steering wheel reaches the final assembly position. FIG. 5 illustrates the condition in which the connector body 20 is completely engaged with the complementary connector 50. The engagement prongs 53 of the complementary connector 50 engage the windows 39 of the connector body 20. The connector body 20 is withheld by the retainer arms 46, which are arranged between the resting surfaces 34 and the cam surfaces 38. The structure of the steering wheel 10 is at a distance d from the final assembly position shown by the dotted line in FIG. 5.

Proceeding downwards along the structure of the steering wheel 10, the connector body 20 moves upwards with respect to the structure of the steering wheel 10. The attachment device 22 of the connector 18 remains fixed with respect to the structure of the steering wheel 10, by which a relative movement is obtained between the connector body 20 and the retainer arms 46. The cam surfaces 38 impress a force on the retainer arms 46 tending to distance the retainer arms 46 in the direction shown by arrow 48 in FIG. 6. The elastic deformation of the retainer arms 46 proceeds to the point in which the retainer arms 46 are released from the respecting resting surfaces 34.

FIG. 7 illustrates the condition in which the retainer arms 46 are completely released from the resting surfaces 34. An additional downwards shift of the structure of the steering wheel 10 takes the steering wheel unit structure to the final possible assembly positions illustrated in FIG. 8. The dimensions are the position of the connector body 20 with respect to the structure of the steering wheel 10 and are determined by considering the possible tolerance in final assembly conditions. The connector body 20 is in a position in which the retainer arms 46 are fully released from the resting surfaces 34. In the final assembly position of the steering wheel, the retainer arms 46 do not impress force in the reciprocal engagement direction of the complimentary connector 50 and the connector 18.

As appears from this description, the connector 18 according to this invention allows the engagement with the complementary connector 50 without the need of direct manual intervention of two connectors. In this way, the steering wheel unit can be made as a completely pre-assembled unit without needing to reciprocally engage the connectors 18, 50. The connectors 18, 50 are coupled automatically during fitting of the steering wheel on the steering shaft (not shown). The connector body 20 will always be in the correct position with respect to the complementary connector 50, regardless of the final position of the steering wheel with respect to the steering shaft, which can vary in the field defined by the possible tolerance.

Starting from the condition illustrated in FIG. 8, in which the connector body 20 is in the final engagement position with respect to the complementary connector 50, disassembling the steering wheel will automatically rearm the retainer arms 46, which will return to engagement position with the resting surfaces 34. This occurs according to a sequence, which is opposite to that described above. Specifically, during steering wheel disassembly, the attachment device 22 moves upwards while the engagement prongs 53 of the complementary connector 50 withhold the connector body 20. The wedged portions 36 widen the retainer arms 46 until they click and engage the resting surfaces 34. When the retainer arms 46 return to the position illustrated in FIG. 5, an additional upwards movement of the steering wheel releases the engagement prongs 53 from the windows 39 and detaches the connector body 20 from the complementary connector 50. At this point, the connector 18 is ready to be fitted again, without the need for additional operations.

Naturally, numerous changes can be implemented to the construction and forms of embodiment of the invention described herein, all comprised within the context of the concept characterising this invention, as defined by the following claims.

We claim:

1. An electric connector for a steering wheel of a vehicle, comprising:
    a connector body having an electric connector;
    an attachment body that is releasably attached to the connector body and has resilient retainer arms for holding the connector body in a pre-assembled position and for engaging the connector body in a final assembly position on the steering wheel; and
    a complementary connector having an electric contact that couples with the electric connector of the connector body.

2. The connector of claim 1, wherein the retainer arms are formed by contoured metallic wire connected to the attachment body.

3. The connector of claim 2, wherein the contoured metallic wire is co-moulded in the attachment body.

4. The connector of claim 1, wherein the connector body has substantially parallel sides having a projecting portion forming a resting surface and a cam surface arranged so that the retainer arms are received between the cam surface and the resting surface.

5. The connector of claim 4, wherein the cam surfaces are arranged so to distance the retainer arms by effect of the relative movement between the connector body and the attachment body.

6. The connector of claim 4, wherein the projecting portions have a wedged portion to assist in the attachment of the retainer arms by guiding the retainer arms until the retainer arms engage between the resting surface and the cam surface.

7. The connector of claim 1, further comprising a housing for receipt of the connector body and the attachment body.

8. The connector of claim 7, wherein the attachment body has a clip-on engagement element for engaging the housing.

9. The connector of claim 1, wherein the connector body has a window and the complementary connector has an engagement prong that is received in the window to attach the connector body to the complementary connector.

10. An electric connector for a steering wheel of a vehicle, comprising:
    a connector body having an electric connector;
    an attachment body having resilient retainer arms for holding the connector body in a pre-assembled position and for engaging the connector body in a final assembly position on the steering wheel; and
    a complementary connector having an electric contact that couples with the electric connector of the connector body.

11. The connector of claim 10, wherein the retainer arms are co-moulded in the attachment body.

12. The connector of claim 11, wherein the connector body has substantially parallel sides having a projecting portion forming a resting surface and a cam surface arranged so that the retainer arms are received between the cam surface and the resting surface.

13. The connector of claim 12, wherein the cam surfaces are arranged so to distance the retainer arms by effect of the relative movement between the connector body and the attachment body.

14. The connector of claim 13, wherein the projecting portions have a wedged portion to assist in the attachment of the retainer arms by guiding the retainer arms until the retainer arms engage between the resting surface and the cam surface.

15. The connector of claim 11, further comprising a housing for receipt of the connector body and the attachment body.

16. The connector of claim 15, wherein the attachment body has a clip-on engagement element for engaging the housing.

17. The connector of claim 16, wherein the connector body has a window and the complementary connector has an engagement prong that is received in the window to attach the connector body to the complementary connector.

* * * * *